United States Patent [19]

Newkirk

[11] Patent Number: 4,867,758
[45] Date of Patent: Sep. 19, 1989

[54] METHOD FOR PRODUCING CERAMIC ABRASIVE MATERIALS

[75] Inventor: Marc S. Newkirk, Newark, Del.

[73] Assignee: Lanxide Technology Company, LP, Newark, Del.

[21] Appl. No.: 894,229

[22] Filed: Aug. 7, 1986

[51] Int. Cl.$^4$ .............................................. B24D 3/00
[52] U.S. Cl. ...................................... 51/293; 51/295; 51/308; 51/309
[58] Field of Search ................. 51/293, 295, 308, 309

[56] References Cited

U.S. PATENT DOCUMENTS

| | | | |
|---|---|---|---|
| 165,933 | 7/1971 | Newkirk et al. | |
| 169,383 | 8/1971 | Newkirk et al. | |
| 924,656 | 7/1978 | Newkirk et al. | |
| 933,797 | 8/1978 | Newkirk et al. | |
| 2,741,822 | 4/1956 | Udy | 25/157 |
| 3,255,027 | 6/1966 | Talsma | 106/65 |
| 3,296,002 | 1/1967 | Hare | 106/40 |
| 3,298,842 | 1/1967 | Suefert | 106/65 |
| 3,419,404 | 12/1968 | Mao | 106/65 |
| 3,421,863 | 1/1969 | Bawa | 29/182.5 |
| 3,437,468 | 4/1969 | Suefert | 51/298 |
| 3,473,938 | 10/1969 | Oberlin | 106/57 |
| 3,473,987 | 10/1969 | Sowards | 156/89 |
| 3,538,231 | 11/1970 | Newkirk et al. | 13/25 |
| 3,789,096 | 1/1974 | Church | 264/60 |
| 3,973,977 | 8/1976 | Wilson | 106/62 |
| 4,425,141 | 1/1984 | Buljan et al. | 51/308 |
| 4,518,397 | 5/1985 | Leitheiser et al. | 51/293 |
| 4,518,398 | 5/1985 | Tanaka et al. | 51/309 |
| 4,543,343 | 9/1985 | Iyori et al. | 51/309 |
| 4,574,003 | 3/1986 | Gerk | 51/309 |
| 4,636,374 | 1/1987 | Kurihara et al. | 501/98 |
| 4,713,360 | 12/1987 | Newkirk et al. | 501/87 |

FOREIGN PATENT DOCUMENTS

| | | |
|---|---|---|
| 0166809 | 8/1984 | European Pat. Off. |
| 0155831 | 9/1985 | European Pat. Off. |
| 0169067 | 1/1986 | European Pat. Off. |

OTHER PUBLICATIONS

"Oxidation of Molten Aluminum Alloys. Reaction with Refractories"–M. Drouzy and M. Richard–Mar. 1984–Fonderie, France No. 332 pp. 121–128.

"Refractories for Aluminum Alloy Melting Furnaces'-'–B. Clavaud and V. Jost–Sep. 1980–Lillian Brassinga (from French) Jan. 1985.

*Primary Examiner*—Paul Lieberman
*Assistant Examiner*—Willie J. Thompson
*Attorney, Agent, or Firm*—Mark G. Mortenson; William E. McShane

[57] ABSTRACT

In the present invention there is provided a method for producing abrasive ceramic and ceramic composite material characterized by an abrasive grain as the comminuted form of a polycrystalline ceramic material. The abrasive grains of the present invention consist essentially of the oxidation reaction product of a parent metal precursor with a vapor phase oxidant, and, optionally one or more metallic constituents such as non-oxidized constituents of the parent metal. There is also provided a method for producing abrasive grains which additionally consist of one or more inert filler materials.

14 Claims, No Drawings

METHOD FOR PRODUCING CERAMIC ABRASIVE MATERIALS

This invention relates to methods for producing abrasive materials, formed as the oxidation reaction product of a parent metal and a vapor-phase oxidant, and comminuted to produce abrasive ceramic or ceramic composite grains. This invention also relates to such materials produced thereby.

In recent years, there has been an increasing interest in the technological advance of abrasive materials and in the production of higher quality and specialized abrasive materials. This invention has as its purpose to provide a novel and improved abrasive material characterized by low friability, prepared by comminuting into grit sized particles a body or slab specially prepared of ceramic or ceramic composite.

In accordance with the present invention, there is provided a method for producing an abrasive material characterized by an abrasive grain as the comminuted form of a polycrystalline ceramic material consisting essentially of the oxidation reaction product of a parent metal precursor with a vapor-phase oxidant, and, optionally, one or more metallic constituents such as non-oxidized constituents of the parent metal. When desired, a ceramic composite may be formed, comprising the polycrystalline ceramic reaction product and one or more filler materials, added, for example, to enhance abrasive performance or to reduce production costs, as described below in detail.

Generally, in the method for producing a ceramic abrasive material in accordance with the present invention, a parent metal precursor is heated in the presence of a vapor-phase oxidant to a temperature above its melting point, but below the melting point of the oxidation reaction product, to form a body of molten parent metal. The molten parent metal is reacted with the vapor-phase oxidant to form an oxidation reaction product, which product is maintained at least partially in contact with, and extends between, the body of molten parent metal and the vapor-phase oxidant. In this temperature range, molten parent metal is transported through the previously formed oxidation reaction product, towards the vapor-phase oxidant. As the molten parent metal contacts the vapor-phase oxidant at the interface between the vapor-phase oxidant and previously formed oxidation reaction product, it is oxidized by the vapor-phase oxidant, and thereby grows or forms a progressively thicker layer or body of oxidation reaction product. The process is continued for a time sufficient to produce a ceramic body. Where desired, depending on the end-use for the abrasive, the oxidation reaction process is conducted for a sufficient time to substantially exhaust the parent metal thereby minimizing the presence of interconnected metal in the ceramic body. This ceramic body is comminuted to the desired grain size as by impact milling, roller milling, gyratory crushing or other conventional techniques depending upon the end-use application of the abrasive material, and the resulting comminuted ceramic material is recovered. The recovered comminuted ceramic material comprises abrasive grains consisting essentially of the oxidation reaction product and, optionally, metallic constituents such as non-oxidized constituents of the parent metal.

In a preferred embodiment of the present invention, a ceramic composite is formed by placing a permeable mass or aggregate of a filler material, which may be preformed as a green body, adjacent to or in contact with the parent metal precursor such that the growing oxidization reaction product of the parent metal infiltrates and embeds at least a portion of the filler material. The parent metal is heated as described above, and the oxidation reaction of the parent metal and vapor-phase oxidant is continued for a time sufficient for the oxidation reaction product to grow through or infiltrate at least a portion of the filler material, thus producing a composite body having a ceramic matrix of oxidation reaction product embedding the filler material, such matrix also containing optionally, one or more metallic constituents. This ceramic composite body is comminuted to a desired particle size by conventional means as discussed above, and the resulting comminuted material is recovered. The recovered material comprises micro-composite abrasive grains consisting essentially of the oxidation reaction product of the parent metal and vapor-phase oxidant, the filler material, and, optionally, one or more metallic constituents.

After the ceramic or ceramic composite body has been initially formed as described above, it is allowed to cool, and then crushed or ground to provide an abrasive grain. The fineness of the grain will depend upon the final use of the product, and therefore the comminuting means is selected based on the desired particle size and the composition of the ceramic body. The method and means for comminuting and sizing are known in the art and form no part of this invention, per se. It may be desirable to first crush the ceramic body into large pieces of about $\frac{1}{4}''$ and $\frac{1}{8}''$ as with a jaw crusher or hammer mill, and then into finer particles of about 8 to 100 mesh or finer as by impact milling. The grit is typically screened to obtain grain fractions of the desired size.

The resulting abrasive grain is characterized by toughness and low friability or high durability. A preferred abrasive grain formed by the method of this invention is characterized by a micro-composite comprising oxidation reaction product intimately bonded with filler as the comminuted form of the grown ceramic body. Thus, on grinding or crushing of the grown ceramic composite body, the resulting abrasive particles contain both ceramic matrix and filler constituents as integrally bonded materials, notwithstanding the substantial reduction in size.

The granular abrasive material of this invention may be used in any of a number of abrasive applications. For example, the abrasive material may be used in loose abrasive applications such as polishing, milling or grit blasting. Where desired, the abrasive material may be used in coated abrasive products or in bonded abrasive products. In the latter, the abrasive grain is bonded with a suitable binder, e.g. resin, glass, metal or other ceramic, and shaped such as into grinding wheels. In the former, the abrasive grain is combined with a suitable adhesive and coated on or applied to a backing sheet or substrate such as felted cellulose, cloth, or paper-board. The abrasive material of this invention may be the only final abrasive in the abrasive article, or may be combined with other abrasive or non-abrasive materials to modify properties or to reduce costs.

Several abrasive materials were prepared in accordance with the present invention, and tested for their friability in comparison with several conventionally produced abrasive materials. The friability test employed on each of the abrasive materials involved in a conventional ball milling technique. Ten grams of the particular abrasive material to be tested was precisely sieved to a specified mesh size, and placed into a steel jar (Abbe Co., Mijit size) along with seven one inch hardened steel balls (200 g, Abbe Co.). The steel jar was closed and placed onto a revolving apparatus and revolved for one hour at 92 revolutions per minute. The resulting material was again sieved with the same screen, and the material which did not pass through the screen was recovered and weighed. The performance of the abrasive materials in the friability test was quantitated as a friability index. These results are listed in Table I below. The friability index is the percent of the abrasive material which survived the ball milling exercise (i.e. the weight of the abrasive material remaining on top of the screen when the material was sieved after ball milling (in grams), divided by the initial sample weight (10 grams), times 100). The greater the friability index, the less friable the material.

Nine materials were tested including three conventionally fabricated materials, fused alumina (38 Alundum, from Norton Co., 46 mesh size), silicon carbide (37 Crystolon, from Norton Co., 14 mesh size), a sol-gel produced alumina-magnesium aluminate material (Cubitron from 3M Co., 20 mesh size and 40 mesh size, both tested) and size materials fabricated in accordance with the present invention and more particularly as described below (designated as abrasive materials A through F).

Abrasive material A was fabricated by placing several ingots of aluminum alloy 380.1 (from Belmont metals, having a nominally identified composition by weight of 8–8.5% Si, 2–3% Zn and 0.1% Mg as active dopants (as described in detail below) and 3.5% Cu as well as Fe, Mn, and Ni; but the actual Mg content was sometimes higher as in the range of 0.17–0.18%) into a bed of alumina particles (E1 Alundum, from Norton, 90 mesh), which was contained in a refractory vessel, such that one surface of each ingot was directly exposed to the air atmosphere. This setup was placed into a furnace and heated up over five hours to 1000° C. Under these conditions, growth of the ceramic body occurred upward from the exposed metal surface into the airspace; no growth occurred into the E1 Alundum particles surrounding the other metal surfaces. The furnace temperature was held at 1000° C. for 24 hours and then cooled down over five hours to ambient. The setup was removed from the furnace, and the resulting ceramic bodies were recovered and comminuted by crushing between two steel plates. The comminuted material was recovered, and sieved to select the 46 mesh size fraction.

Abrasive material B was fabricated by placing several ingots of aluminum alloy 6061 (having a nominal composition by weight of 0.6% Si, 1.0% Mg and 0.25% Cu and Cr) into a bed of the same 90 mesh alumina particles as above, contained in a refractory vessel with one surface of each ingot exposed to the air. A thin layer of silicon dioxide dopant material was applied to the exposed metal surfaces. This setup was placed in a furnace and heated up over six hours to 1325° C. Under these conditions also, ceramic growth occurred exclusively into the air and not into the bedding material. The furnace temperature was held at 1325° C. for approximately 160 hours thereby substantially exhausting the unoxidized aluminum metal from within the formed ceramic bodies. The resulting ceramic material was comminuted as above and screened to select the 12 mesh size fraction.

Abrasive material C was fabricated by completely submerging several ingots of an aluminum alloy containing 10% by weight Si, and 3% by weight Mg into a bed of alumina particles (38 Alundum from Norton Co., 220 mesh size) which was contained in a refractory vessel. This setup was placed into a furnace and heated up over six hours at 1250° C. In this case growth occurred from the metal surfaces into the surrounding bedding material, incorporating the 38 Alundum particles into ceramic composite bodies. The furnace temperature was held at 1250° C. for 120 hours and cooled down to ambient over size hours. The setup was removed from the furnace and the resulting composite ceramic bodies comprising the oxidation reaction product embedding the filler particles were recovered, and subsequently comminuted by the same crushing technique employed above. The comminuted composite material was recovered, and screened to 12 mesh size.

Abrasive material D was fabricated by submerging several ingots of the same alloy employed to fabricate material C into a bed of tabular alumina (from Alcoa Co., 60 mesh) filler material which was contained in a refractory vessel. This setup was placed into a furnace and heated up over a six hour period to 1250°0 C. where reaction product growth occurred into the filler particles surrounding the metal. The furnace was held at 1250° C. for 144 hours, and cooled back to ambient over a six hour period. The resulting composite body, comprising the alumina oxidation reaction product embedding the tabular alumina filler material, was comminuted as above, and the material was screened to 12 mesh size.

Abrasive material E was fabricated by submerging several ingots of aluminum alloy 380.1, as employed to fabricate material A, into a bed of a sol-gel produced alumina-magnesium aluminate (Cubitron from 3M Co., 80 mesh) filler material which was contained in a refractory vessel. This setup was placed into a furnace and heated up over five hours to 1000° C. The furnace temperature was held at 1000° C. for four hours and cooled down to ambient over five hours. The resulting ceramic composite bodies, comprising the alumina oxidation reaction product embedding the sol-gel filler material, were recovered and comminuted as above. The resulting material was screened to 12 mesh size.

Abrasive material F was fabricated by separately heating a bed of silicon carbide particles (37 Crystolon from Norton Co., 220 mesh) and approximately 100 g of the 380.1 alloy employed above to 1000° C. The molten aluminum alloy was then poured over the bed of silicon carbide filler material, and more of the same silicon carbide filler was layered on top of the molten metal. This setup was held at 1000° C. for 48 hours and then removed from the furnace. The resulting ceramic composite, comprising an alumina oxidation reaction product embedding the silicon carbide filler material, was recovered. The ceramic composite was comminuted as above and screened to 12 mesh size.

These materials were subjected to the above-described friability test, and the results are tabulated in Table I below. As is evident from the table, five of the six materials fabricated in accordance with the present invention proved to be less friable, under the described test conditions, than the conventionally produced materials which were also tested. Although material A produced in accordance with the present invention proved to have lower friability than the conventionally fabricated abrasive materials tested, this result illustrated a desirable characteristic of the present invention, namely that materials can be produced with a wide range of friability characteristics which may be helpful in meeting the needs of different abrasive applications.

TABLE A

| Abrasive Material | Screen Mesh Size | Friability Index |
| --- | --- | --- |
| Alumina (38 Alundum, from Norton Co.) | 46 | 6.1 |
| Silicon Carbide (37 Crystolon from Carborundum Co.) | 14 | 9.1 |
| Sol-gel alumina-magnesium aluminate (Cubitron, from 3M Co.) | 20 | 13.1 |
| Sol-gel alumina-magnesium aluminate (Cubitron, from 3M Co.) | 40 | 18.5 |
| Abrasive Material A | 46 | 2.5 |
| Abrasive Material B | 12 | 38.3 |
| Abrasive Material C | 12 | 25.5 |
| Abrasive Material D | 12 | 29.2 |
| Abrasive Material E | 12 | 40.4 |
| Abrasive Material F | 12 | 44.8 |

As used in this specification aand the appended claims, the following terms have the indicated meanings:

"Ceramic" is not to be unduly construed as being limited to a ceramic body in the classical sense, that is, in the sense that it consists entirely of non-metallic and inorganic materials, but rather refers to a body which is predominantly ceramic with respect to either composition or dominant properties, although the body may contain minor or substantial amount of one or more metallic constituents derived from the parent metal, or reduced from a dopant, most typically within a range of from about 1–40% by volume, but may include still more metal.

"Oxidation reaction product" generally means one or more metals in any oxidized state wherein a metal has given up electrons to or shared electrons with another element, compound, or combination thereof. Accordingly, an "oxidation reaction product" under this definition includes the product or reaction of one or more metals with an oxidant such as those described in this application.

"Oxidant" means one or more suitable electron acceptors or electron sharers and is a gas (vapor) or a constituent of a gas at the process conditions.

"Parent metal" means that metal, e.g., aluminum, which is the precursor for the polycrystalline oxidation reaction product, and includes that metal as a relatively pure metal, a commercially available metal with impurities and/or alloying constituents, or an alloy in which that metal precursor is the major constituent; and when a specified metal is mentioned as the parent metal, e.g., aluminum, the metal identified should be read with this definition in mind unless indicated otherwise by the context.

"Composite" comprises a heterogeneous material, body or article made of two or more different materials which are intimately combined in order to attain desired properties of the composite. For example, two different materials may be intimately combined by embedding one in a matrix of the other. A ceramic composite structure typically comprises a ceramic matrix which encloses one or more diverse kinds of filler materials such as particulates, fibers, rods, or the like.

In accordance with the present invention, an abrasive maerial is provided as the comminuted form of a ceramic or ceramic composite body formed upon oxidation of a metal precursor. In forming the body, the parent metal, which is the precursor of the oxidation reaction product, is provided in an appropriate form, e.g., in the form of an ingot, billet, plate, etc., and positioned in a bed of inert and/or filler material contained in a crucible or other refractory container. An inert material is one which is substantially not penetrable to growth of the oxidation reaction product theethrough under the process conditions. This inert bed is in contrast to a permeable bed of filler for use in producing a composite structure, through which the oxidation reaction product grows to embed the filler within the resulting ceramic matrix. The inert material, which may be in particulate form, serves to retain the body of molten parent metal for oxidation and growth into the surrounding atmosphere or into a permeable filler.

The resulting lay-up comprising the parent metal, the bed of inert material and/or filler, placed in a suitable crucible or other container, is heated to a temperature above the melting point of the parent metal but below the melting point of the oxidation reaction product. However, it should be understood that the operable or preferred range of temperatures may not extend over the entire temperature interval between the melting points of the parent metal and the oxidation reaction product. Accordingly, at this temperature or within this temperature range, the parent metal melts to form a body or pool of molten parent metal, and, on contact with the oxidant, the molten metal reacts to form a layer of oxidation reaction product. Upon continued exposure to the oxidizing environment, the remaining molten metal is progressively drawn into and through the oxidation reaction product in the direction of the oxidant so as to cause continued growth of the polycrystalline material at or near the ceramic-oxidant interface to form a ceramic or ceramic composite product.

The polycrystalline oxidation reaction product grows at a substantially constant rate (that is, a substantially constant rate of thickness increase over time), provided there is sufficient oxidant interchange. Interchange of an oxidizing atmosphere, in the case of air, can be conveniently provided by vents in the furnace. Growth of the reaction product continues until at least one of the following occurs: (1) substantially all of the parent metal is consumed; (2) the oxidant is depleted or consumed or the oxidizing atmosphere is replaced by a non-oxidizing atmosphere or evacuated; or (3) the reaction temperature is altered to be substantially outside the reaction temperature envelope, e.g., below the melting point of the parent metal. Usually, the temperature is reduced by lowering the furnace temperature, and then the material is removed from the furnace.

The resulting ceramic product consists essentially of the oxidation reaction product of the parent metal with the oxidant and, optionally, one or more metal constituents such as non-oxidized constituents of the parent metal. It should be understood that the resulting polycrystalline material may exhibit porosity which may result from a partial or nearly complete replacement of the metal phase, but the volume percent of voids in the product will depend largely on such conditions as temperature, time, and type of parent metal used. The polycrystalline oxidation reaction product is in the form of crystallites which are at least partially interconnected. Although the present invention is hereinafter described with particular emphasis on aluminum and specific embodiments of aluminum as the parent metal, this reference is for exemplary purposes only, and it is to be understood that other metals such as silicon, titanium, hafnium, zirconium, etc., also can be employed which meet, or can be doped to meet, the criteria of the invention.

The vapor-phase oxidant is one which is normally gaseous or vaporized at the process conditions to provide an oxidizing atmosphere. Typical vapor-phase oxidants include, for example: oxygen or an oxygen-containing gas, nitrogen or a nitrogen-containing gas, a halogen, sulphur, phosphorus, arsenic, carbon, boron, selenium, tellurium, and compounds and combinations thereof, for example, methane, oxygen, ethane, propane, acetylene, ethylene, propylene (the hydrocarbon as a source of carbon), and mixtures such as air $H_2/H_2O$ and a $CO/CO_2$, the latter two (i.e. $H_2/H_2O$ and $CO/CO_2$) being useful in reducing the oxygen activity of the environment. When a vapor-phase oxidant is identified as containing or comprising a particular gas or vapor, this means a vapor-phase oxidant in which the identified gas or vapor is the sole oxidizer of the parental metal under the conditions obtained in the oxidizing environment utilized. Air therefore falls within the definition of an "oxygen-containing gas" oxidant but not within the definition of a "nitrogen-containing gas" oxidant. An example of a "nitrogen-containing gas" oxidant as used herein in the claims is "forming gas", which typically contains about 96 volume percent nitrogen and about 4 volume percent hydrogen.

Certain parent metals under specific conditions of temperature and oxidizing atmosphere meet the criteria necessary for the oxidation phenomenon of the present invention with no special additions or modifications. However, dopant materials used in combination with the parent metal can favorably influence or promote the oxidation reaction process. While not wishing to be bound by any particular theory or explanation of the function of the dopants, it appears that some dopants are useful in those cases where appropriate surface energy relationships between the parent metal and its oxidation reaction product do not intrinsically exist. Thus, certain dopants or combinations of dopants, which reduce the solid-liquid interfacial energy, will tend to promote or accelerate the development of the polycrystalline structure formed upon oxidation of the metal into one containing channels for molten metal transport, as required for the new process. Another function of the dopant materials may be to initiate the ceramic growth phenomenon, apparently either by serving as a nucleating agent for the formation of stable oxidation product crystallites, or by disrupting an initially passive oxidation product layer in some fashion, or both. This latter class of dopants may not be necessary to create the ceramic growth but such dopants may be important in reducing any incubation period for the initiation of such growth to within commercially practical limits for certain parent metal systems.

The function or functions of the dopant material can depend upon a number of factors other than the dopant material itself. These factors include, for example, the particular parent metal, the end product desired, the particular combination of dopants when two or more dopants are used, the use of an externally applied dopant in combination with an alloyed dopant, the concentration of the dopant, the oxidizing environment, and the process conditions.

Useful dopants for an aluminum parent metal, particuarly with air as the oxidant, include, for example, magnesium metal and zinc metal, in combination with each other or in combination with other dopants described below. These metals, or a suitable source of the metals, may be alloyed into the aluminum-based parent metal at concentrations for each of between about 0.1–10% by weight based on the total weight of the resulting doped metal. The concentration range for any one dopant will depend on such factors as the combination of dopants and the process temperature. Concentrations within this range appear to initiate the ceramic growth, enhance metal transport and favorably influence the growth morphology of the resulting oxidation reaction product.

Other dopants which are effective in promoting polycrystalline oxidation reaction product growth, for aluminum-based parent metal systems are, for example, silicon, germanium, tin and lead, especially when used in combination with magnesium or zinc. One or more of these other dopants, or a suitable source of them, is alloyed into the aluminum parent metal system at concentrations for each of from about 0.5 to about 15% by weight of the total alloy; however, more desirable growth kinetics and growth morphology are obtained with dopant concentrations in the range of from about 1–10% by weight of the total parent metal alloy. Lead as a dopant is generally alloyed into the aluminum-based parent metal at a temperature of at least 1000° C. so as to make allowances for its low solubility in aluminum; however, the addition of other alloying components, such as tin, will generally increase the solubility of lead and allow the alloying materials to be added at a lower temperature.

One or more dopants may be used depending upon the circumstances, as explained above. For example, in the case of an aluminum parent metal and with air as the oxidant, particularly useful combinations of dopants include (a) magnesium and silicon or (b) magnesium, zinc and silicon. In such examples, a preferred magnesium concentration falls within the range of from about 0.1 to about 3% by weight, for zinc in the range of from about 1 to about 6% by weight, and for silicon in the range of from about 1 to about 10% by weight.

Additional examples of dopant materials, useful with an aluminum parent metal, include sodium, lithium, calcium, boron, phosphorus and yttrium, which may be used individually or in combination with one or more other dopants depending on the oxidant and process conditions. Sodium and lithium may be used in very small amounts in the parts per million range, typically about 100–200 parts per million, and each may be used alone or together, or in combination with other dopant(s). Rare earth elements such as cerium, lanthanum, praseodymium, neodymium and samarium are also useful dopants, and herein again especially when used in combination with other dopants.

It is not necessary to alloy any dopant material into the parent metal. For example, selectively applying one or more dopant materials in a thin layer to either all, or a portion of, the surface of the parent metal enables local ceramic growth from the parent metal surface or portions thereof and lends itself to growth of the polycrystalline ceramic material into the permeable filler in selected areas. Thus, growth of the polycrystalline ceramic material can be controlled by the localized placement of a dopant material upon the parent metal surface. The applied coating or layer of dopant is thin relative to the thickness of the parent metal body, and growth or formation of the oxidation reaction product extends substantially beyond the dopant layer, i.e., to beyond the depth of the applied dopant layer. Such layer of dopant material may be applied by painting, dipping, silk screening, evaporating, or otherwise applying the dopant material in liquid or paste form, or by sputtering, or by simply depositing a layer of a solid particulate dopant or a solid thin sheet or film of dopant onto the surface of the parent metal. The dopant material may, but need not, include either organic or inorganic binders, vehicles, solvents, and/or thickeners. One particularly preferred method of applying the dopants to the parent metal surface is to utilize a liquid suspension of the dopants in a water/organic binder mixture sprayed onto a parent metal surface in order to obtain an adherent coating which facilitates handling of the doped parent metal prior to processing.

The dopant materials when used externally are usually applied to a portion of a surface of the parent metal as a uniform coating thereon. The quantity of dopant is effective over a wide range relative to the amount of parent metal to which it is applied and, in the case of aluminum, experiments have failed to identify either upper or lower operable limits. For example, when utilizing silicon in the form of silicon dioxide externally applied as the dopant for an aluminum-based parent metal using air or oxygen as the oxidant, quantities as low as 0.00003 gram of silicon per gram of parent metal, or about 0.0001 gram of silicon per square centimeter of exposed parent metal surface, together with a second dopant providing a source of magnesium and/or zinc produce the polycrystalline ceramic growth phenomenon. It also has been found that a ceramic structure is achievable from an aluminum-based parent metal using air or oxygen as the oxidant by using MgO or $MgAl_2O_4$ as the dopant in an amount greater than about 0.003 gram of Mg per square centimeter of parent metal surface to be doped and greater than about 0.0008 gram of Mg per gram of parent metal to be oxidized.

In certain preferred embodiments of the present invention, the parent metal, which, for example, may comprise aluminum, silicon, zirconium, hafnium or titanium, and a permeable mass of filler material, is positioned adjacent to each other and oriented with respect to each other so that growth of the oxidation reaction product as described above will be in a direction towards the filler material in order that the filler, or a part thereof, will be infiltrated by the growing oxidation reaction product and embedded therein. This positioning and orientation of the parent metal and filler with respect to each other may be accomplished by simply embedding a body of parent metal within a bed of particulate filler material or by positioning one or more bodies of parent metal within, on or adjacent to a bed or other assembly of filler material. The filler may comprise, for example, platelets, a bed of spheres (solid or hollow bubbles), powders or other particulates, aggregate, refractory fiber, tubules, whiskers, or the like, a combination of the foregoing. The assembly is, in any case, arranged so that a direction of growth of the oxidation reaction product will permeate or engulf at least a portion of the filler material such that void spaces between filler particles or articles will be filled in by the grown oxidation reaction product matrix.

When one or more dopant materials are required or desirable to promote or facilitate growth of the oxidation reaction product through a permeable mass of filler, the dopant may be used on and/or in the parent metal, and alternatively or in addition, the dopant may be used on, or be provided by, the filler material. Thus, the dopant or dopants may be provided as alloying constituents of the parent metal, or may be applied to at least a portion of the surface of the parent metal as described above, or may be applied to or supplied by the filler or a part of the filler bed, or any combination of two or more of the aforesaid techniques may be employed. In the case of the technique whereby a dopant or dopants are applied to the filler, the application may be accomplished in any suitable manner, such as by dispersing the dopants throughout part or the entire mass of filler in fine-droplet or particulate form, preferably in a portion of the bed of filler adjacent the parent metal. Application of any of the dopants to the filler may also be accomplished by applying a layer of one or more dopant materials to and within the bed, including any of its internal openings, interstices, passageways, intervening spaces, or the like, that render it permeable. A source of the dopant may also be provided by placing a rigid body containing the dopant in contact with and between at least a portion of the parent metal surface and the filler bed. For example, if a silicon dopant is required, a thin sheet of silicon-containing glass or other material can be placed upon a surface of the parent metal onto which a second dopant had been previously applied. When the parent metal overlaid with the silicon-containing material is melted in an oxidizing environment (e.g., in the case of aluminum in air, between about 850° C. to about 1450° C., preferably about 900° C. to about 1350° C.), growth of the polycrystalline ceramic material into the permeable filler occurs. In the case where the dopant is externally applied to at least a portion of the surface of the parent metal, the polycrystalline oxide structure generally grows within the permeable filler substantially beyond the dopant layer (i.e., to beyond the depth of the applied dopant layer). In any case, one or more of the dopants may be externally applied to the parent metal surface and/or to the permeable bed of filler. Additionally, dopants alloyed within the parent metal and/or externally applied to the parent metal may be augmented by dopant(s) applied to the filler bed. Thus, any concentration deficiencies of the dopants alloyed within the parent metal and/or externally applied to the parent metal may be augmented by additional concentration of the respective dopant(s) applied to the bed, and vice versa.

In the case of employing aluminum or its alloys as the parent metal and an oxygen-containing gas as the oxidant in the process of making a ceramic composite structure, the appropriate amounts of dopants are alloyed into or applied to the parent metal, as described above. The parent metal is then placed in a crucible or other refractory container with the metal surface exposed to an adjacent or surrounding mass of permeable filler material in said container and in the presence of an oxidizing atmosphere (typically air at ambient atmospheric pressure). The resulting assembly is then heated within a furnace to elevate the temperature thereof into the region typically between about 850° C. to about 1450° C., or more preferably, between about 900° C. to about 1350° C. depending upon the filler material, dopant or the dopant concentrations, or the combination of any of these whereupon the parent metal transport begins to occur through the oxide skin normally protecting the aluminum parent metal.

The continued high temperature exposure of the parent metal to the oxidant allows the formation of the polycrystalline reaction product as described above. When a solid oxidant is employed in the making of a ceramic composite structure, it may be dispersed through the entire volume of filler material, or through a portion of the filler material adjacent to the parent metal. When a liquid oxidant is so employed, the entire volume of filler material may be coated or soaked by a suitable liquid oxidant. In any case, the growing oxidation reaction product progressively impregnates the permeable adjacent filler material with the interconnected oxidation reaction product matrix which also may contain non-oxidized constituents of the parent metal, or metallic constituents of a reducible dopant, thus forming a cohesive composite. The growing polycrystalline matrix impregnates or permeates the filler material.

Examples of fillers useful in the invention, depending upon parent metal and oxidation systems chosen, include one or more of an oxide, nitride, boride or carbide. Such materials include, for example, aluminum oxide, silicon carbide, silica, silicon aluminum oxynitride, zirconium oxide, zirconium boride, titanium nitride, barium titanate, boron nitride, titanium diboride, magnesium aluminate spinel, and mixtures thereof. However, any suitable filler may be employed in the invention.

The following example illustrates certain aspects of the invention.

An abrasive material produced in accordance with the present invention was compared to a conventionally produced alumina abrasive material (38 Alundum, from Norton Co., sieved to 14 mesh size) in its ability to abrade a commercially available steel body.

The abrasive material of the present invention comprised microcomposite grains consisting essentially of the oxidation reaction product of an aluminum alloy and air as a vapor-phase oxidant, and a silicon carbide filler material. The material was fabricated in accordance with the procedure described in the fabrication of abrasive material F discussed above. The material was screened to 14 mesh size.

Twenty grams of the above described conventional 38 Alundum alumina abrasive, and 20 grams of the alumina-silicon carbide composite abrasive fabricated in accordance with the present invention were placed in separate steel jars (Abbe Co., Mijit size). Two sets of three threaded steel rods were carefully weighed and placed one set each into each jar. The jars were covered and placed on a revolving apparatus and revolved for 1.5 hours at 92 revolutions per minute. The threaded steel rods were recovered from each jar and again weighed to determine the loss of mass suffered by the steel rods.

The pre-abrasion mass of the rods processed with the conventional abrasive was 36.37 g as compared with 36.32 g after abrasion. The 0.05 mass loss represents a 0.13% loss in the 1.5 hour abrasion time. The pre-abrasion mass of the rods processed with the abrasive material of the present invention was 36.49 g as compared with 36.44 g after abrasion. That 0.05 loss represents a 0.14% loss in the same time.

What is claimed is:

1. A method comprising the steps of:
   (A) heating said parent metal to a temperature above its melting point but below the melting point of the oxidation reaction product to form a body of molten metal, contacting a zone of a mass of filler material with said body of molten metal, reacting said molten metal with said vapor-phase oxidant to form said oxidation reaction product, and maintaining at least a portion of said oxidation reaction product in contact with and between said molten metal and said oxidant to progressively transport molten metal through the oxidation reaction product toward the oxidant and towards and into said mass of filler material so that fresh oxidation reaction product continues to form at an interface between said oxidant and previously formed oxidation reaction product that has infiltrated said mass of filler material, and continuing said oxidation reaction for a time sufficient to infiltrate at least a portion of said filler with said oxidation reaction product to form a ceramic composite body, leaving metallic constituents dispersed through said oxidation reaction product, and
   (B) comminuting said ceramic composite body, and
   (C) recovering the comminuted ceramic composite material.

2. A method for producing an abrasive material characterized by grains consisting essentially of (1) the oxidation reaction product of a parent metal with a vapor-phase oxidant and (2) at least one filler material, said method comprising the steps of:
   (A) heating said parent metal to a temperature above its melting point but below the melting point of the oxidation reaction product to form a body of molten metal, contacting a zone of a mass of filler material with said body of molten metal, reacting said molten metal with said vapor-phase oxidant to form said oxidation reaction product, and maintaining at least a portion of said oxidation reaction product in contact with and between said molten metal and said oxidant to progressively transport molten metal through the oxidation reaction product toward the oxidant and towards and into said mass of filler material so that fresh oxidation reaction product continues to form at an interface between said oxidant and previously formed oxidation reaction product that has infiltrated said mass of filler material, and continuing said oxidation reaction for a time sufficient to infiltrate at least a portion of said filler with said oxidation reaction product to form a ceramic composite body, and
   (B) comminuting said ceramic composite body, and
   (C) recovering the comminuted ceramic composite material.

3. The method according to claim 1 or claim 2, wherein said comminuted material is admixed with a bonding agent, molded and set thereby forming an abrasive article.

4. The method according to claim 1 or claim 2, wherein said comminuted material is admixed with an adhesive and applied to a backing sheet thereby forming an abrasive article.

5. The method according to claim 1 or claim 2, wherein said filler comprises at least one material selected from the group consisting of oxides, nitrides, borides and carbides.

6. The method according to claim 1 or claim 2, wherein said filler material comprises at least one material selected from the group consisting of alumina, silicon carbide, zirconia, diamond, titanium diboride, boron nitride, boron carbide, and magnesium aluminate spinel.

7. The method according to any of claims 1, or 2, wherein said parent metal comprises aluminum, said oxidant comprises air, and said oxidation reaction product comprises alumina.

8. An abrasive ceramic composite material produced according to the method of claim 1.

9. A method comprising the steps of:
(A) heating said parent metal to a temperature above its melting point but below the melting point of the oxidation reaction product to form a body of molten metal, contacting a zone of a mass of filler material with said body of molten metal, reacting said molten metal with said oxidant to form said oxidation reaction product, and maintaining at least a portion of said oxidation reaction product in contact with and between said molten metal and said oxidant to progressively transport molten metal through the oxidation reaction product towards the oxidant and towards and into said mass of filler material so that fresh oxidation reaction product continues to form at an interface between said oxidant and previously formed oxidation reaction product that has infiltrated said mass of filler material, and continuing said oxidation reaction for a time sufficient to infiltrate at least a portion of said filler with said oxidation reaction product to form a ceramic composite body, and
(B) comminuting said ceramic composite body, and
(C) recovering the comminuted ceramic composite material.

10. The method of claim 1, claim 2 or claim 9, wherein said parent metal comprises at least one metal selected from the group consisting of aluminum, silicon, titanium, hafnium and zirconium.

11. The method of claim 9, wherein said oxidant comprises at least one oxidant which is a liquid at said temperature.

12. The method of claim 9, wherein said oxidant comprises at least one oxidant which is a solid at said temperature.

13. The method according to claim 6, wherein said parent metal comprises aluminum, said oxidant comprises air, and said oxidation reaction product comprises alumina.

14. The method according to claim 5, wherein said parent metal comprises aluminum, said oxidant comprises air, and said oxidation reaction product comprises alumina.

* * * * *

UNITED STATES PATENT AND TRADEMARK OFFICE
CERTIFICATE OF CORRECTION

PATENT NO. : 4,867,758
DATED : September 19, 1989
INVENTOR(S) : Newkirk

It is certified that error appears in the above-identified patent and that said Letters Patent is hereby corrected as shown below:

Column 5, line 26: "aand" should read --and--;

Column 6, line 4: "maerial" should read --material--;
          line 13: "theethrough" should read --therethrough--;

Column 7, line 25: "parental" should read --parent--;

Column 8, lines 3-4: "par-ticuarly" should read --particularly--;

Column 11, line 68: after "method" the following should be inserted: --for producing an abrasive material characterized by grains consisting essentially of (1) the oxidation reaction product of a parent metal with a vapor-phase oxidant, (2) at least one filler material, and (3) one or more metallic constituents, said method--;

Column 13, line 9: --or claim 2-- should be inserted after "claim 1" and before ".";
          line 10: after "method" the following should be inserted: --for producing an abrasive material characterized by grains comprising (1) the oxidation reaction

UNITED STATES PATENT AND TRADEMARK OFFICE
CERTIFICATE OF CORRECTION

PATENT NO. : 4,867,758

DATED : September 19, 1989

INVENTOR(S) : Newkirk

It is certified that error appears in the above-identified patent and that said Letters Patent is hereby corrected as shown below:

product of a parent metal with an oxidant and (2) at least one filler material, said method--.

Signed and Sealed this

Twelfth Day of February, 1991

Attest:

HARRY F. MANBECK, JR.

*Attesting Officer*     *Commissioner of Patents and Trademarks*